UNITED STATES PATENT OFFICE.

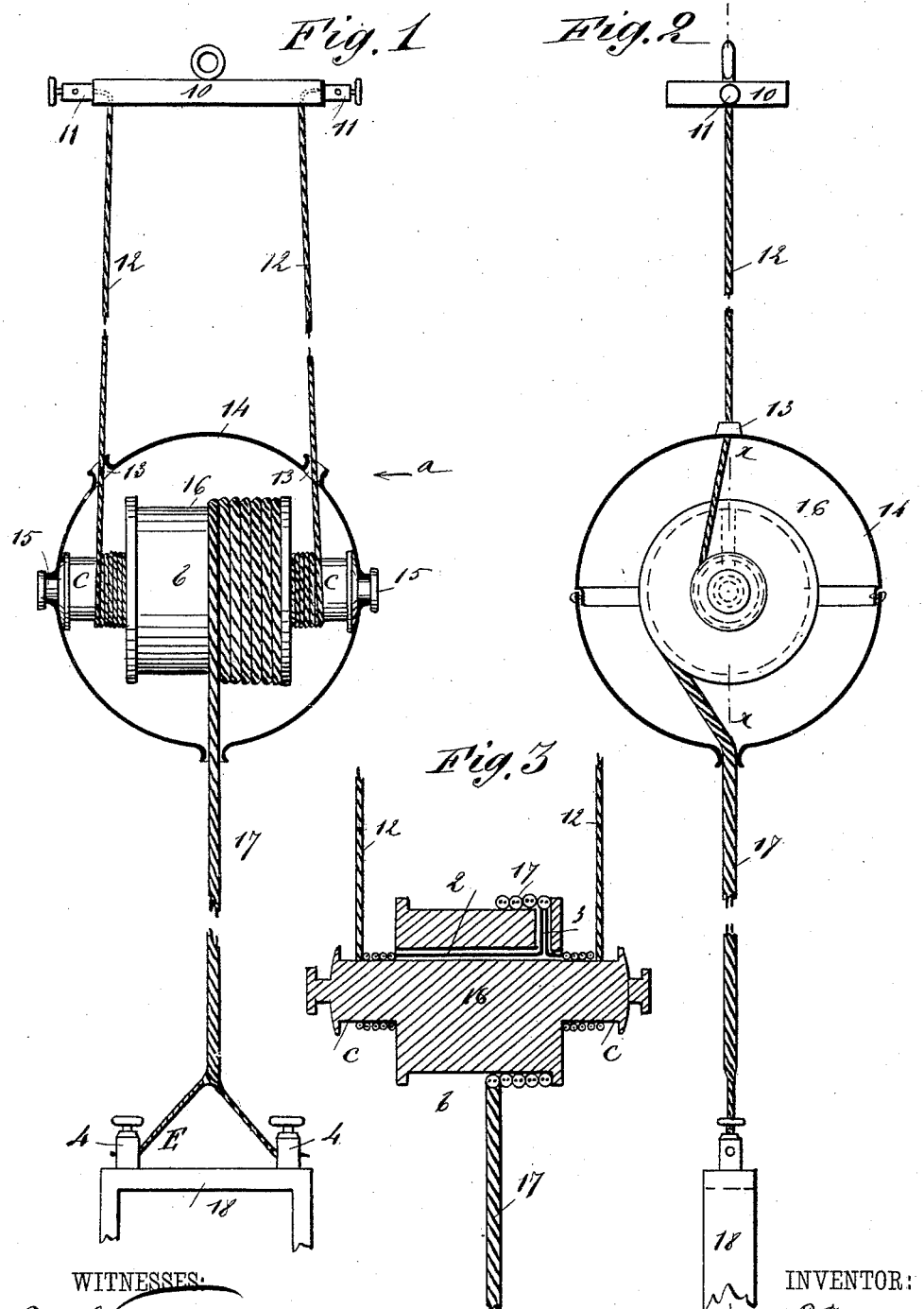

WILLIAM F. BRADNER, OF GREELEY, COLORADO.

HANGING-LAMP ADJUSTER.

SPECIFICATION forming part of Letters Patent No. 415,896, dated November 26, 1889.

Application filed March 16, 1888. Serial No. 267,357. (No model.)

*To all whom it may concern:*

Be it known that I, WILLIAM F. BRADNER, of Greeley, in the county of Weld and State of Colorado, have invented a new and Improved Electric-Lamp Hanger, of which the following is a full, clear, and exact description.

The invention will be first described, and then specifically pointed out in the claims.

Reference is to be had to the accompanying drawings, forming a part of this specification, in which similar figures of reference indicate corresponding parts in all the views.

Figure 1 is a side view of my improved form of hanger for electric lamps and part of an electric-lamp frame, the inclosing-case being shown in section. Fig. 2 is a view taken in the direction of the arrow $a$ in Fig. 1, the case, however, being shown in section; and Fig. 3 is a view taken on line $x\ x$ of Fig. 2.

In the drawings, 10 represents a block arranged for connection with the ceiling or any other convenient place, to which block there are secured binding-screws 11, that are in electric communication with cables 12, which lead downward through apertures 13, that are formed in a casing 14, in which casing there are also formed bearings for the trunnions 15 of a double drum 16, said drum being formed with a central section $b$ and side sections $c$, the central section being of much greater diameter than the side sections. The lower ends of the cables lead to the sections $c$, and pass thence through an aperture 2, that is parallel, or about so, with the axis of the drum, and from this aperture the cables are carried outward through an aperture 3, there to be associated to form a double cable 17, which is coiled upon the peripheral face of the central section $b$. The lower end of the double cable 17 is divided, and the two branches $e$ and $f$ lead to binding-posts 4, that are in electric communication with a lamp-frame 18. From the above construction it will be seen that if the line-wires of the system be connected to the binding-posts 4 the lamp-frame will be in electric communication with said line-wires.

The diameters of the drum-sections $c$ and $b$ are so proportioned that when a lamp is hung within the frame the frictional contact between the cables 12 12 and the sides of the case about the apertures through which the cable passes and the contact of the cable 17 with the sides of the case about the aperture through which it passes will be sufficient to hold the lamp in such position as it may be placed; but if the cable 17 be relieved of the weight of the lamp and its frame, the weight of the case 14 and of the drum carried thereby will be such that the drum will drop downward, the cables 12 at this time unwinding from the drum-section $c$, and as the cables 12 and the double cable 17 are wound in inverse direction it follows that the double cable 17 will be wound upon the central drum-section, and that when the lamp is again released it will be held in a higher plane.

In some instances my improved hanger may be used for other purposes than the one described, if occasion may require—such, for instance, as suspending ordinary lamps, though it is shown in the drawings for use with electric lamps only.

In defining the scope of my claims in this case to another application, (filed by me December 27, 1888, Serial No. 294,767,) in which I have made broader claims, I would state that I make in this case no broad claims to the differential pulley and suspending-cord, but claim only the special construction herein shown and described.

Having thus described my invention, I claim as new and desire to secure by Letters Patent—

1. The combination, with a central drum and smaller side drums at the ends thereof, of suspending-strands wound in the same direction around the small drum, and the strand wound around the larger drum oppositely to the other strands and depending therefrom, and a casing or frame in which said drums are mounted having openings in its top over the smaller drums, and through which the suspension-strands pass in frictional contact with the sides or walls thereof, and a bottom opening under the larger middle drum and through which the lamp-strand passes in frictional contact with the side or wall thereof from said larger pulley, substantially as set forth.

2. The combination, with the casing or frame having two openings in its top at opposite sides of its center and a central bottom opening, of a drum journaled in the casing and formed of a larger central section and smaller side sections, the smaller sections being under the said top openings, of the electric suspending strands or cables extending down through said top openings and wound around the smaller drums, and a double electric strand or cable wound oppositely around the larger drum and having the inner ends of each of its wires in electrical connection with the ends of the suspending-strands, the lower end of double cable being forked for connection with the binding-posts of an electric lamp, substantially as set forth.

3. In an electric-lamp hanger, the double cable-receiving drum formed of a central section $b$ and smaller sections $c$, passages 2 and 3 being formed in the drum and leading from side sections $c$ to the surface of the middle section, substantially as set forth.

4. The combination, with the attaching piece or block 10, having binding-screws, of the casing or frame 14, having top openings 13 13 and a bottom opening, the double drum 16, journaled in said casing, formed of a middle section $b$ and smaller side sections $c\,c$, and provided with the passages 2 3, the electric strands or cables 12, secured to block 10 by said screws, passing down through the openings 13 around the sections $c\,c$, thence through said passages and formed into a single cable 17, wound oppositely around the section $b$, and divided at its lower end, substantially as set forth.

WILLIAM F. BRADNER.

Witnesses:
H. W. BROOKS,
W. G. BROOKS.